(12) United States Patent
Mellen

(10) Patent No.: US 7,714,704 B1
(45) Date of Patent: May 11, 2010

(54) REMOVABLE VIDEO SAFETY SYSTEM FOR A MOVING VEHICLE

(76) Inventor: Joshua Mellen, 36914 Anglers Way, Pinehurst, TX (US) 77362

( * ) Notice: Subject to any disclaimer, the term of this patent is extended or adjusted under 35 U.S.C. 154(b) by 325 days.

(21) Appl. No.: 11/844,690

(22) Filed: Aug. 24, 2007

(51) Int. Cl.
*B60Q 1/00* (2006.01)
(52) U.S. Cl. .................. 340/425.5; 340/937; 340/427; 340/426.26; 340/432; 348/156; 348/148; 701/1
(58) Field of Classification Search .............. 340/425.5, 340/937, 426.1, 427, 426.26, 432; 348/156, 348/148; 701/1
See application file for complete search history.

(56) References Cited

U.S. PATENT DOCUMENTS

| | | | |
|---|---|---|---|
| 6,690,268 B2 * | 2/2004 | Schofield et al. ............ 340/438 |
| 6,718,239 B2 * | 4/2004 | Rayner ........................ 701/35 |
| 6,741,165 B1 * | 5/2004 | Langfahl et al. ......... 340/426.1 |
| 6,819,231 B2 * | 11/2004 | Berberich et al. ........... 340/435 |
| 6,831,556 B1 * | 12/2004 | Boykin .................... 340/539.1 |
| 7,076,204 B2 | 7/2006 | Richenstein et al. |
| 7,245,207 B1 * | 7/2007 | Dayan et al. ................ 340/435 |
| 7,323,969 B1 * | 1/2008 | Delgado et al. .......... 340/425.5 |
| 7,353,086 B2 * | 4/2008 | Ennis ............................ 701/1 |
| 7,511,607 B2 * | 3/2009 | Hubbard et al. ............. 340/435 |
| 7,551,067 B2 * | 6/2009 | Otsuka et al. ............... 340/436 |

* cited by examiner

*Primary Examiner*—Daryl Pope
(74) *Attorney, Agent, or Firm*—Buskop Law Group, PC; Wendy Buskop

(57) ABSTRACT

A removable video safety system for a moving vehicle comprising: a display device and a video device, both adapted to be removably mounted on the moving vehicle, and an audio device in proximity to the display device. The video device and audio device are in communication with the display device. Computer instructions and data storage in the display device instruct a processor to receive a video stream from the video device, display the video stream on the display device, prevent operation of the audio device while the display device is not displaying the video stream, and permit operation of the audio device while the display device is displaying the video stream.

20 Claims, 6 Drawing Sheets

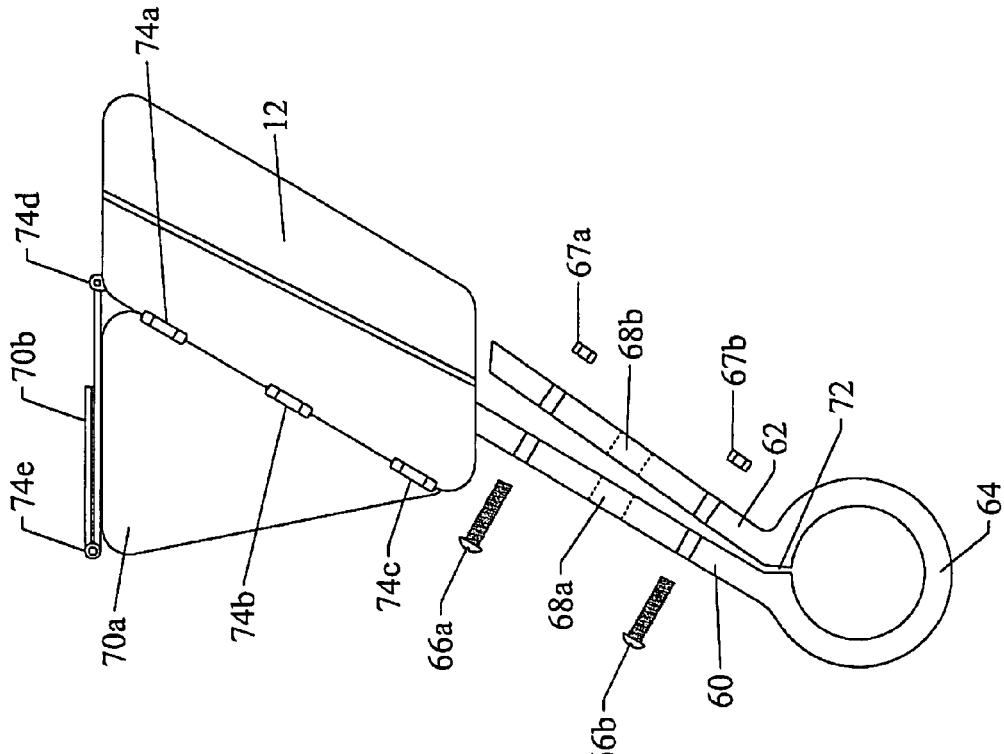
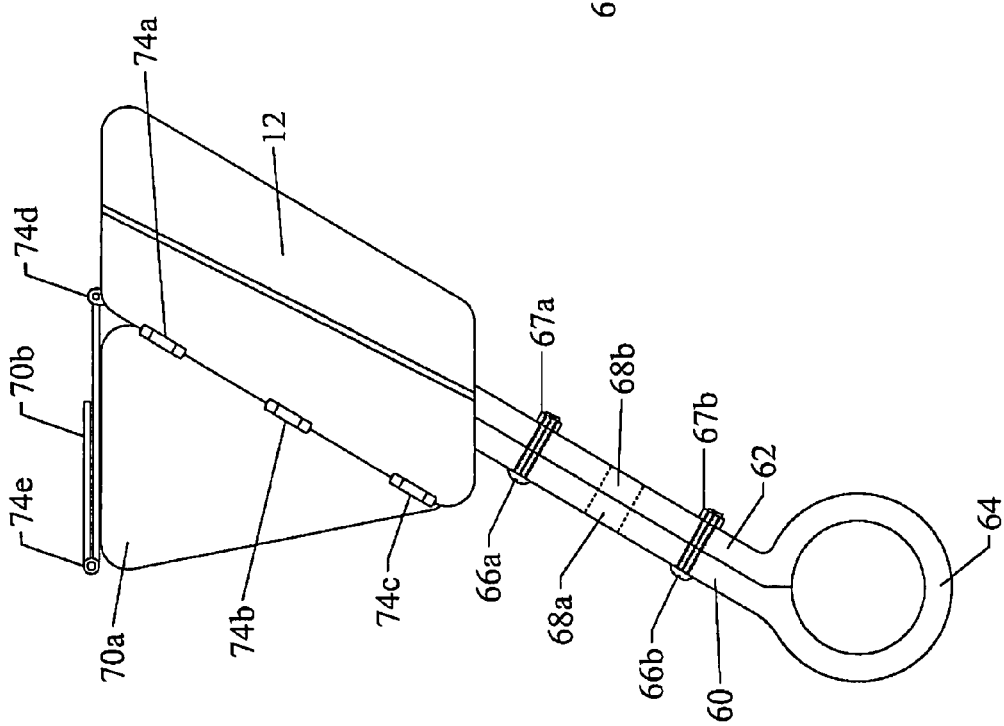

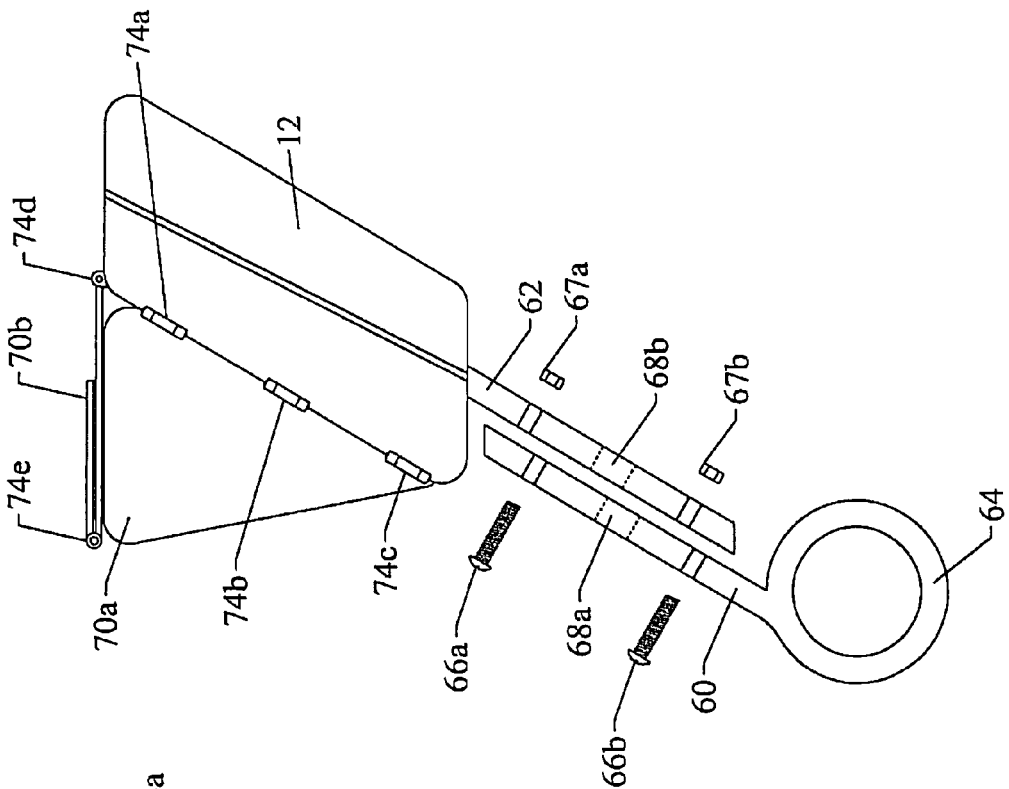
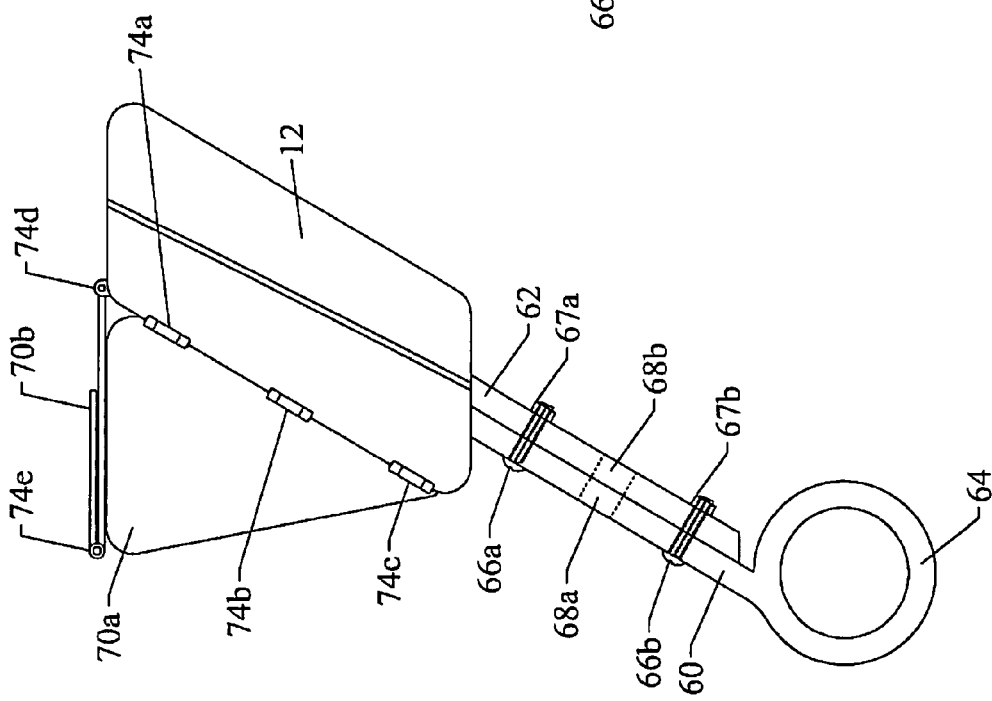

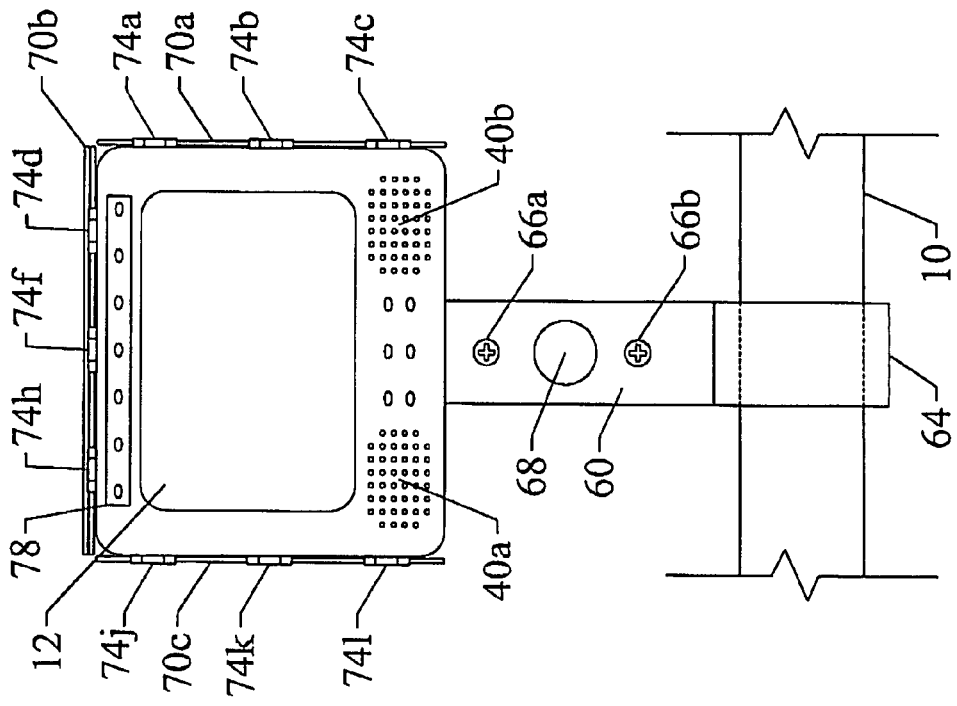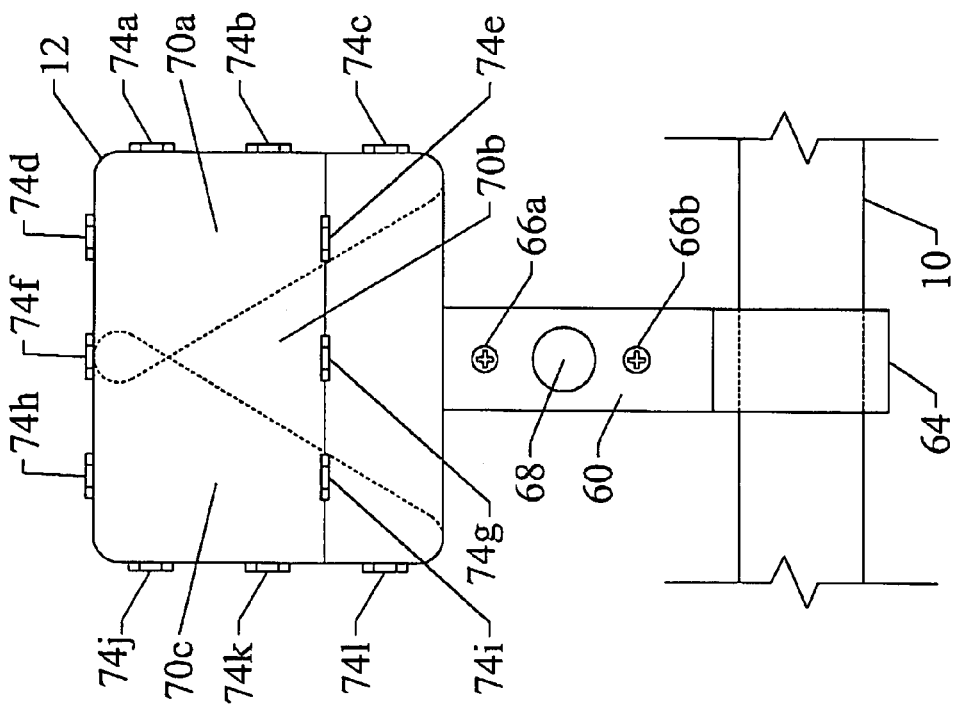

REMOVABLE VIDEO SAFETY SYSTEM FOR A MOVING VEHICLE

FIELD

The present embodiments relate to a removable video safety system for a moving vehicle.

BACKGROUND

A need exists for a video system that can be removably mounted on all types of moving vehicles to provide continuous video displays depicting rear views and blind spots.

A further need exists for a video system that can be integrated with an audio device to allow safe use of the audio device during operation of a moving vehicle.

The present embodiments meet these needs.

BRIEF DESCRIPTION OF THE DRAWINGS

The detailed description will be better understood in conjunction with the accompanying drawings as follows:

FIG. 3A depicts a side view of an embodiment of removable mounting means for mounting the components of the present system on a moving vehicle.

FIG. 3B depicts the removable mounting means of FIG. 3A in an open position.

FIG. 4A depicts an alternative embodiment of the removable mounting means of FIG. 3A disposed on a moving vehicle.

FIG. 4B depicts the removable mounting means of FIG. 4A in an open position.

FIG. 5A depicts an embodiment of the removable mounting means disposed on a moving vehicle.

FIG. 5B depicts the removable mounting means of FIG. 5A having optional visors in an open position.

Figure 1:
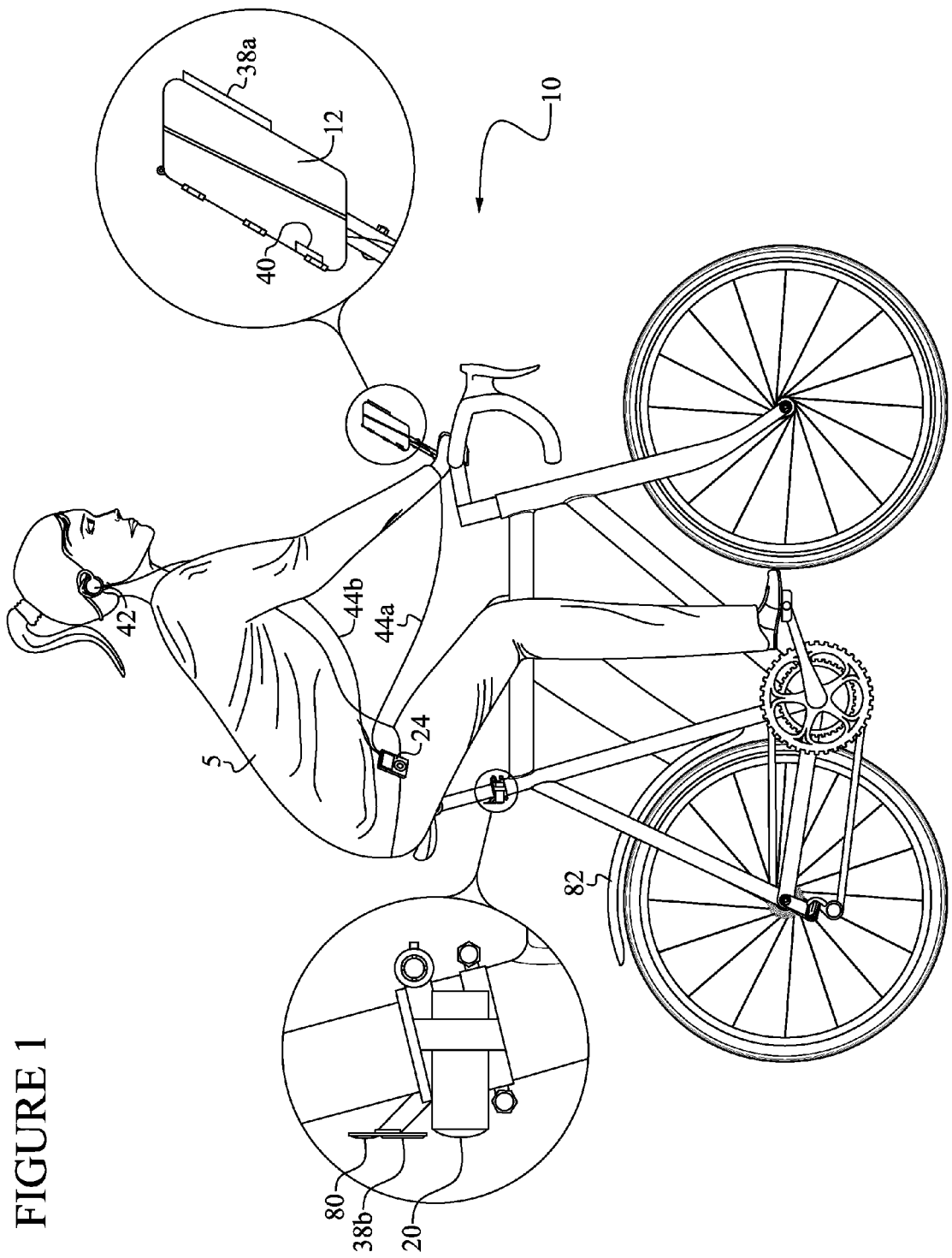
FIG. 1 depicts a diagram of the present system removably mounted on a moving vehicle.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

The present embodiments relate to a removable video safety system for a moving vehicle.

The present system uniquely and advantageously integrates a video and display system, removably mounted on a moving vehicle, with an audio device, allowing users of audio devices to safely operate the audio device simultaneously with the moving vehicle.

Often cyclists, drivers, and other individuals listening to an audio device while operating moving vehicles are unable to hear other vehicles approaching from behind or entering into a blind spot. The present system provides a continuous video stream to the individual to enhance safe operation of the moving vehicle, while preventing use of the audio device unless the video stream is displayed. For example, using the present system, a cyclist could operate a MP3 player during a recreational bicycle ride while viewing a continuous video stream displaying a rear view from the bicycle, however the operation of the MP3 player would be terminated while the display is inactive. By using this device, cyclists and drivers can avoid deadly accidents, paralysis, brain hemorrhaging, broken bones, cracked skulls, and other injuries.

The components of the present system can be integrated as a single, lightweight, one-piece unit, removably mounted on a moving vehicle, such as on the handlebars of a bicycle or motorcycle, wherein a video device provides a rear view display image to the driver while enabling the driver to listen to an audio device, such as a MP3 player playing the driver's favorite tunes. The components of the present system can also be separable components, able to be advantageously located on different parts of the moving vehicle to provide views of blind spots and convenient locations of controls for the system components.

The present system enhances the safety of moving vehicles by allowing vehicle operators to see rear views and blind spots continuously, on a real time basis, thereby saving lives, preventing injury, and conserving the costs associated with vehicular damage, property damage, and personal injury. For example, a biker listening to a MP3 player could fail to hear a car approaching from behind. The biker could think he could make a left turn safely, but instead turn directly in front of the car and cause a collision. The resulting injury could require weeks of hospitalization of the biker, medical care for the biker and the car driver, damage to the driver's vehicle costing additional monies to repair, and replacement costs for the biker's bicycle. Use of the present system could prevent such hospital and medical costs, and repair and replacement costs of both vehicles, as well as associated costs such as work missed due to injury.

The present system further possesses the advantage of being portable, weighing less than three pounds, can be removably attached to any type of vehicle, and can be removed and reattached to other vehicles quickly and easily, allowing a single system to enhance the safe operation of any number of moving vehicles, such as bicycles, motorcycles, all-terrain vehicles, automobiles, boats, trucks, trailers, or barges. In an embodiment, the present system can weigh slightly more than three pounds if extra features, such as a global positioning system "GPS", a security housing, an alarm system, or other electronic interface devices are added to the system. However, in its most basic mode, the present system is anticipated to be a lightweight, modular, interconnected system.

The present removable safety system includes a display device, such as an eight to ten inch flat screen monitor, adapted to be removably mounted on a moving vehicle, such as on the handlebars of a 2007 BMX Flowmaster bicycle. A display, such as those found on a Verizon™ Pocket PC, or a display used on a Tom-Tom™ global positioning system from Tom-Tom™ of the Netherlands, and additional display devices can be used and is not limited to the display devices mentioned.

It is contemplated that the display device can have any size or shape, including square displays, rectangular displays, trapezoidal displays, round displays, elliptical displays, polygon-shaped displays, and other geometric display shapes.

The display device can be removably mounted on the moving vehicle using a metal locking device, which can further include a locking means, such as a keyed lock, a biometric lock, a coded lock, a combination lock, or combinations thereof. In an embodiment, the mounting means can include a first bar attached to the display device, which would interconnect with a second bar attached to a fastener. The fastener is attachable to the moving vehicle, such as a ring attachable to the handlebars or other portions of a bicycle. One or more screws, bolts, or similar means can be used to interconnect the two bars. One or more keyed locks or other locking devices can be inserted through one or more holes in the two bars to prevent removal and theft of the display device.

The display device can include a power source, such as one or more rechargeable or non-rechargeable batteries, solar panels, fuel cells, or other similar power sources. The one or more batteries can include rechargeable or non-rechargeable AAA, AA, nine-volt, lithium-ion, nickel-cadmium, or other types of batteries having appropriate voltages, given the size and power needed to operate the display device.

It is contemplated that the rechargeable power source can be charged by the motion of the moving vehicle, such as by using a hub generator, which can include a 2.4W or 3.0W Hub-Dynamo made by Shimano, having model numbers HB-0050-D, HB-0050-DR, or HB-0051-DR, a SON28, SON20, a SONXS100 hub generator made by Schmidt Nabendynamo, or other similar generators.

The display device further includes a processor, such as a processor available from Intel™ of California or AMD™. The processor is in communication with a data storage medium, which can include a removable data storage medium, such as a DataTraveler 100, made by Kingston Technology. Use of data storage cards can be an advantageous embodiment due to their light weight. Further, use of a universal serial bus stick drive is advantageous during severe weather conditions, having high resistance to rain and impact.

A video device can include a video camera, such as a Sony™ video camera, a digital camera, such as a Cannon™ digital camera, a cellular telephone, such as a Verizon™ Pocket PC, a portable computer, such as a Dell™ Laptop, or other video cameras that can be removably mounted to the moving vehicle.

It is contemplated that the video device can obtain video images at a range of up to 2500 feet or more. The video device can also include a gyroscope or software to compensate for the motion of the moving vehicle, such as a Steadicam™. The video device can also include a camera capable of infrared viewing or night vision.

The video device can be removably mounted to the moving vehicle using a locking device similar to the mounting means for the display device. The video mounting means can include one or more threaded fasteners or locks, such as a component that secures around a post beneath a bicycle seat.

In another embodiment, the video device can be mounted on other parts of a moving vehicle to provide a video stream that can enhance the safe operation of the moving vehicle. The video camera could be mounted to other portions of other vehicles using conventional plate and interlocking rail sliding mechanisms, loop fasteners, or elastic cords, such as bungee cords. For example, a video device can be mounted on the rear portion of a bicycle frame or motorcycle frame for providing a rear view, or along the side of a large truck to enable viewing blind spots.

It is contemplated that the present system can include a splash guard mounted beneath the video device to prevent mud from the moving vehicle, such as from a bicycle tire or automobile wheel, from impacting the video device. The splash guard can be made from plastic and can range in size from about 6 inches to about 10 inches in length and about 2 inches to about 4 inches in width, depending on the size of the tire. The splash guard can be curved upward toward the top of the moving vehicle, or downward to follow the curvature of the tire, depending on the wind resistant characteristics and degree of splash protection desired.

The video device can be in direct communication with the display device, such as connected using a wire, or in wireless communication with the display device. Wireless communication can include use of the internet, a local area network, a wide area network, a satellite network, a cellular network, an infrared signal, a radio signal, a Bluetooth™ signal, or combinations thereof. Use of wireless communication can enable placement of the video device on any number of positions on the moving vehicle, such as beneath a bicycle seat.

The video device can include an independent power source, similar to the display device power source, or the video device can be powered using the display device power source. The video device power source can be the same type of power source as the display device power source, described above.

An audio device, such as a Windows Media Audio (WMA) player, a cassette tape player, a compact disk player, a digital video disk player, a cellular telephone, or a portable computer, can also be in communication with the display device. The audio device could also be a MP3 player, or a portable radio, which can include combination XM Radios and MP3 players, such as a Helix™, NeXus50™, or NeXus25™, made by Samsung or an Inno™ made by Pioneer. The audio device could include a plurality of audio devices, such as a XM Radio receiver and a MP3 player.

The audio device can be in direct or wireless communication with the display device, or combinations thereof. The audio device can be in proximity to the display device, such as removably mounted to the display device, removably mounted to the video device, removably mounted to the moving vehicle, or worn by an occupant in the moving vehicle. For example, a cyclist could wear a MP3 player attached to an article of clothing, and the MP3 player could be in direct or wireless communication with the display device.

The audio device can include an independent power source, similar to the display device power source, or the audio device can be powered using the display device power source. The audio device power source can be the same type of power source as the display device power source, described above.

In an embodiment, the audio device can include an audio device processor in communication with audio device data storage, such as a MP3 player having storage for containing audio files and computer instructions for instructing the audio device software to retrieve and play selected audio files. The audio device data storage medium can be removable.

It is contemplated that the audio device processor can also provide an index to the display device, displaying the audio files contained in the audio device data storage for viewing simultaneously with the images from the video device.

The audio device can be in communication with a wearable audio output device, such as headphones. The audio device can be capable of wireless communication with the wearable audio output device, such as an iMD-100 Bluetooth™ capable I-Pod™, or a MP-820 Bluetooth™ capable MP3 player, made by Boomgear Products. The wearable audio output device can also include headphones capable of wireless communication, such as a GN Netcom 9120-Flex Wireless Headset, Pioneer SE DIR800C HDPH Dolby Digital Wireless Headphones, or Sennheiser RS-110 Wireless Headphones.

It is contemplated that the display device can also include one or more small speakers, such as a Sound Slim, made by Panasonic, speakers having model numbers YDG50G-38 or YD66G-24, made by Zhejiang Innuovo Loudspeaker Co., speakers having model numbers SW-1250L, SW-8020L, or SW-1030L, made by Multistar Industries, Co., or speakers having model number TS-T110 made by Pioneer Electronics. The speakers can be connected to the display device, or connected to the moving vehicle and in direct or wireless communication with the display device. The speakers can be powered by an independent power source, the display device power source, the video device power source, the audio device power source, or combinations thereof.

The present system can further include computer instructions in the display device data storage for instructing the processor to receive a video stream from the video device and display the video stream on the display device.

The video stream can be an analog or a digital video stream. It is contemplated that the display device can include an analog-to-digital converter, such as video analog-to-digital converters having part numbers ADV7180, ADV7181B, ADV7184, ADV7188, ADV7401, or ADV7403, made by Analog Devices, or converters having part numbers SOT23-6/LLP-6, MSOP-8, MSOP-10, or TSSOP-16, made by National Semiconductors, for converting the video stream to a selected format. Use of conversion software with the processor can also be contemplated.

Use of audio analog-to-digital converters, such as part number AD1974, AD1871, AD1877, or AD1870 made by Analog Devices, is further contemplated for converting audio files to a selected format.

The computer instructions further instruct the processor to prevent operation of the audio device while the display device is not displaying the video stream, and to permit operation of the audio device while the display device is displaying the video stream. This function of the computer instructions ensures the safe operation of the audio device by preventing a user from impeding his or her audio awareness of the surrounding area unless the user can see a video stream depicting rear views and blind spots. For example, using the present system, a biker cannot listen to a MP3 player without seeing cars approaching from behind using the display device.

In an embodiment, the data storage can include one or more audio files, such as MP3 files and computer instructions for instructing the processor to transmit audio files from the display device to the audio device.

The data storage can further include computer instructions for instructing the processor to display information relating to one or more audio files on the display device. Displayed information can include titles, artists, lengths of musical tracks or sizes of audio files, a battery indicator, an oscilloscope display, a graphic equalizer display, and other similar information. Displayed information can also include sorted or unsorted lists of audio files, such as an index of songs.

It is contemplated that the display device can include input means, such as a touch screen, a joystick, one or more buttons, one or more switches, and other similar means for controlling the video device, the audio device, the display device, or combinations thereof.

In a contemplated embodiment, the audio device, the video device, the display device, or combinations thereof, can include one or more lights to provide visibility and enhance the safety of the moving vehicle. The lights can be powered by the display device power source, by other power sources of the present system, or by an independent power source. Separate lights, such as a LT002 Shimano LP-R600 Nexus Headlight, or a LT145 or LT147 Schmidt E6 Headlight, can be in communication with the display device power source. Use of small, energy-saving light emitting diodes "LED" can also be contemplated.

In an embodiment, the display device can include an odometer, which can be a digital odometer, such as wireless bike computers including a Vetta RT255, RT233, RT288L, or VL110 WL, a Sigma Sport BC1606L DTS, BC906, BC506, BC1606L DT, BC506, BC1106 DTS, or BC1106, or other similar digital or non-digital odometers, for tracking the distance traveled by the moving vehicle while the display device is active.

It is also contemplated that the display device can include a global positioning system, such as a Forerunner 101 GPS, Forerunner 201 GPS, Foretrex 101, or e-Trex Legend Handheld GPS, made by Garmin, global positioning software in the data storage, or combinations thereof. Use of global positioning system receivers, such as a GPS 18 USB, a mobile 10 GPS receiver with Bluetooth having model number 010-00579-00, made by Garmin, or a CW20/20S or CW12-TIM GPS Receiver made by NavSync, is also contemplated. Further, global positioning system chip sets can also be used with the processor.

The global positioning system can provide information regarding weather conditions, temperature, distance traveled, and other similar information to the display device. The global positioning system can also be used to track the moving vehicle to prevent theft or to aid lost or injured vehicle operators.

The present system can include theft protection means, such as sounding alarms, and means to render the audio device, the video device, the display device, or combinations thereof non-functional if forcibly removed from the moving vehicle. The present system can also include one or more codes, such as pin numbers, passwords, biometric readers, or other similar security devices to prevent use of the display device, the video device, the audio device, or combinations thereof by individuals who are not the owner.

The present system can further include display, audio, and video devices that are weatherproofed, to protect the present system from rain and other inclement weather. The display device and video device can further include glare protection or polarized viewing surfaces. It is contemplated that glare protection can reduce glare by about 75 percent to about 90 percent.

In a contemplated embodiment, the video device can include one or more motion sensors disposed proximate to the video device that are in direct or wireless communication with the display device. The display device can have one or more lights, such as light emitting diodes, that are responsive to input from the motion sensor. The lights can activate, blink, flash, play a sequence, or combinations thereof to indicate the presence of motion. This feature can ensure that a driver that is not dedicating his or her full attention to the display device can have his or her attention focused by the one or more lights during specific time intervals when the motion sensor detects motion. Use of motion sensors provides the additional benefit of allowing operators of moving vehicles to devote more attention to safe vehicle operations, while only directing attention to the display device when motion is detected.

Referring now to FIG. 1, a diagram depicting the present system removably mounted on a moving vehicle is shown.

FIG. 1 depicts an individual (5) on a moving vehicle (10). While FIG. 1 depicts moving vehicle (10) as a bicycle, moving vehicle (10) can be any type of moving vehicle, including a motorcycle, an all-terrain vehicle, an automobile, a truck, a barge, a trailer, a boat, or another similar moving vehicle.

Display device (12) is depicted removably mounted to moving vehicle (10). While FIG. 1 depicts display device (12)

removably mounted to the handlebars of a bicycle, display device (12) can be removably mounted to any part of moving vehicle (10).

Display device (12) is shown having a first light (38a), which can be used for providing illumination of the area ahead of moving vehicle (10), providing illumination of display device (12), and enhancing the visibility of moving vehicle (10) to prevent collisions. While only one light is shown on display device (12), any number of lights can be disposed on any of the components of the present system.

Display device (12) is further shown having a speaker (40). Speaker (40) can be any kind of speaker, and while only a single speaker is depicted, any number of speakers can be disposed on or in direct communication with display device (12). It is also contemplated that one or more speakers can be disposed elsewhere on moving vehicle (10) and in wireless communication with display device (12).

FIG. 1 also depicts a video device (20) removably mounted to moving vehicle (10). Video device (20) is depicted as a camera, however video device (20) can be any type of video device, including a video camera, a digital camera, a cellular telephone, or a portable computer.

While video device (20) is depicted removably mounted to the rear side of a bicycle seat, video device (20) can be removably mounted to any part of moving vehicle (10).

Video device (20) is contemplated to be in wireless communication with display device (12), however it is also contemplated that video device (20) can be in direct communication with display device (12), such as by connecting video device (20) and display device (12) with one or more wires for transmitting power, video streams, or combinations thereof.

Video device (20) is depicted having a second light (38b) which can be the same type of light as first light (38a) or a different type of light for providing illumination of the area viewed by video device (20).

A motion sensor (80) is shown proximate to video device (20). It is contemplated that motion sensor (80) is in wireless communication with display device (12), however motion sensor (80) can also be in direct communication with display device (12). When motion sensor (80) detects motion in the area viewed by video device (20), such as an approaching vehicle, one or more lights disposed on display device (12), such as first light (38a) or separate light emitting diodes, can activate, flash, or play a sequence to alert individual (5) and draw attention to display device (12).

A splash guard (82) is shown disposed on moving vehicle (10) to prevent mud or water from the rear tire of moving vehicle (10) from impacting video device (20). While splash guard (82) is shown having a downward curve, following the curvature of the wheels of moving vehicle (10), splash guard can have any shape or dimension.

FIG. 1 further depicts an audio device (24) worn by individual (5). It is also contemplated that audio device (24) can be physically connected, removably mounted, or integrated within display device (12) or video device (20). Audio device (24) can also be removably mounted to any part of moving vehicle (10).

Audio device (24) is shown in direct communication with display device (12) using a first wire (44a), however it is contemplated that audio device (24) can also be in wireless communication with display device (12), such as by using a network.

Audio device (24) is further shown in direct communication with wearable audio output device (42), worn by individual (5), using a second wire (44b). Wearable audio output device (42) is depicted as headphones, however use of other similar wearable audio output devices can also be contemplated. In an embodiment, audio device (24) can be in wireless communication with wearable audio output device (42).

It is contemplated that communication between audio device (24) and display device (12) permits sound files from audio device (24) to be output using speaker (40). It is further contemplated that communication between audio device (24) and display device (12) enables a processor within display device (12) to terminate use of audio device (24) while display device (12) is not displaying a video stream from video device (20), and to permit use of audio device (24) while display device (12) is displaying the video stream.

Figure 2:
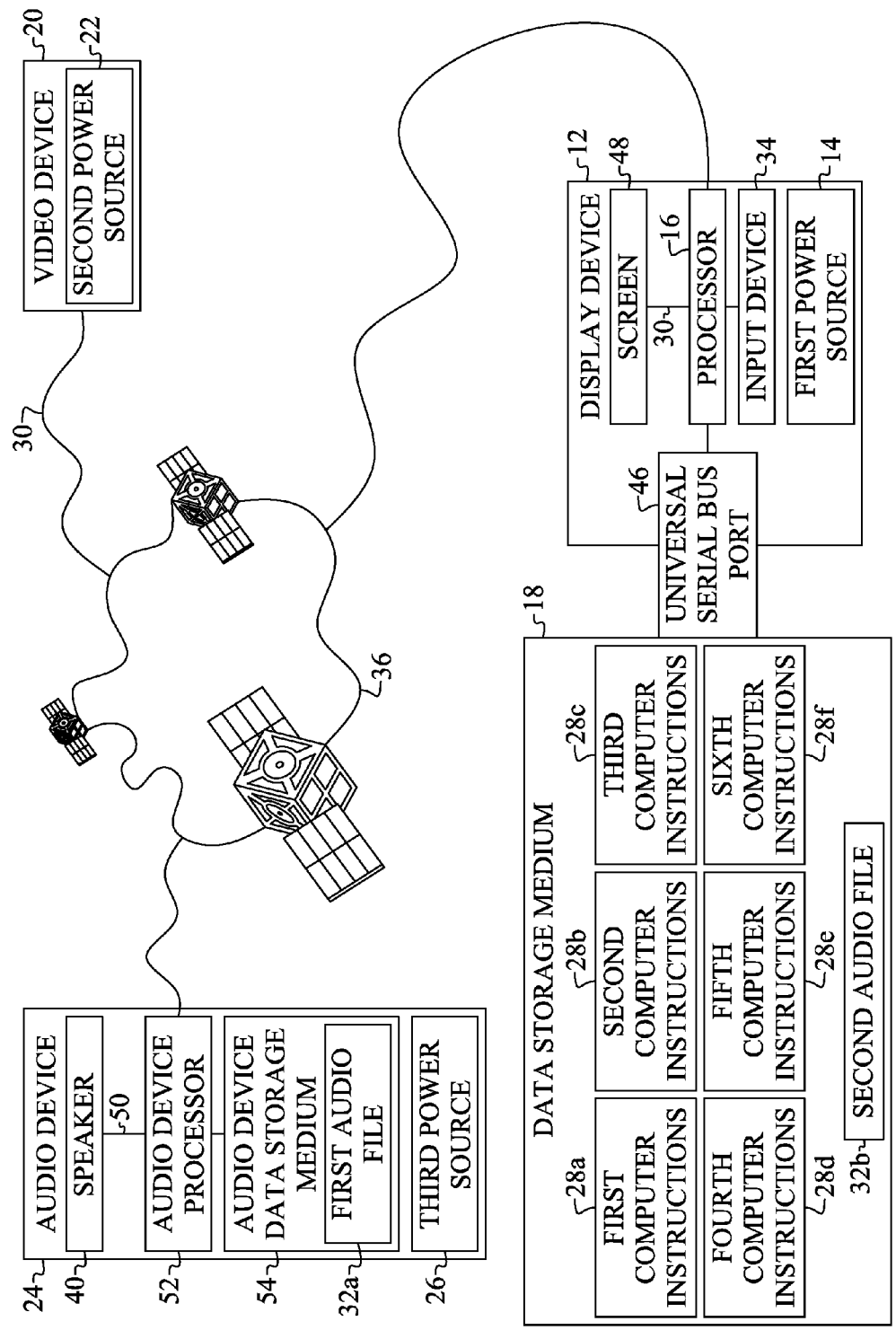
FIG. 2 depicts a block diagram of the components of the present system.

Referring now to FIG. 2, a block diagram depicting the components of the present system is shown.

FIG. 2 depicts display device (12), video device (20), and audio device (24) in wireless communication using a network (36). Network (36) can be any kind of network, including the internet, a local area network, a wide area network, a satellite network, a cellular network, or combinations thereof. It is also contemplated that display device (12), video device (20), and audio device (24) can be in wireless communication using an infrared signal, a radio signal, a Bluetooth™ signal, or combinations thereof.

Display device (12) is depicted having a first power source (14). While first power source (14) is depicted as a battery, first power source (14) can include rechargeable or non-rechargeable batteries, solar panels, fuel cells, and other similar power sources.

Display device (12) is further depicted having a processor (16) in communication with a removable data storage medium (18) using a universal serial bus port (46). Data storage medium (18) can be any kind of removable or non-removable data storage medium of any size.

Display device (12) is also depicted having a screen (48). Display device (12) is further depicted in communication with input device (34), which can be used to control display device (12), video device (20), audio device (24), or combinations thereof. It is also contemplated that video device (20), audio device (24), or combinations thereof can have separate or additional input or control means.

Video device (20) is shown having a second power source (22), which can be the same type of power source as first power source (14), or a different type of power source. In an embodiment, second power source (22) can be omitted, and video device (20) can be connected to display device (12) for receiving power from first power source (14).

Audio device (24) is shown having a third power source (26), which can be the same type of power source as first power source (14), second power source (22), or a different type of power source. Third power source (26) can also be omitted, and audio device (24) can be connected to display device (12) or video device (20), for receiving power from first power source (14) or second power source (22), respectively.

Audio device (24) is further shown having an audio device processor (52) in communication with an audio device data storage medium (54), which can be a removable or non-removable data storage medium of any size. Audio device (24) is shown in communication with speaker (40), which outputs an audio stream (50) transmitted by audio device (24). In an embodiment, audio device (24) can be in wireless communication with speaker (40). Speaker (40) can be any type of wearable, portable, or fixed audio output device of any size.

Audio device data storage medium (54) is shown having a first audio file (32a), which can be output as audio stream (50) by speaker (40).

Data storage medium (18), in communication with display device (12), is shown having first computer instructions (28a) for instructing processor (16) to receive a video stream (30) from video device (20). Second computer instructions (28b) instruct processor (16) to display video stream (30) on a screen (48) of display device (12).

Data storage medium (18) is also depicted having third computer instructions (28c) for instructing processor (16) to prevent operation of audio device (24) while display device (12) is not displaying video stream (30). Fourth computer instructions (28d) instruct processor (16) to permit operation of audio device (24) while display device (12) is displaying video stream (30).

Data storage medium (18) is shown having fifth computer instructions (28e) for instructing processor (16) to transmit a second audio file (32b), also contained in data storage medium (18), to audio device (24). Sixth computer instructions (28f) can instruct processor (16) to display information relating to audio file (32a and 32b) or other similar information on screen (48) of display device (12).

Referring now to FIG. 3A, an embodiment of removable mounting means for mounting the components of the present system on a moving vehicle is shown.

Display device (12) is shown attached to a first mounting bar (60). First mounting bar (60) can be made from any stiff material, including metal or plastic, and can vary in length depending on the size of moving vehicle (10) and placement on moving vehicle (10). First mounting bar (60) can be weatherproofed to resist rust and inclement weather.

A mounting ring (64) is depicted attached to a second mounting bar (62), which can be of similar construction as first mounting bar (60). Mounting ring (64) can have an opening adapted to allow mounting ring (64) to be placed over a portion of a moving vehicle, such as the handlebars of a bicycle. Mounting ring (64) can be made from any durable material, including metal, plastic, rubber, one or more polymers, or combinations thereof. While mounting ring (64) is depicting as a ring, mounting ring (64) can be of any size or shape able to engage a part of a moving vehicle in a secure fit.

FIG. 3A depicts first mounting bar (60) attached to mounting ring (64) such that first mounting bar (60) extends between mounting ring (64) and display device (12). Second mounting bar (62) is shown interlaid with first mounting bar (60), abutting against display device (12) such that second mounting bar (62) also extends between mounting ring (64) and display device (12).

The alignment of first mounting bar (60) and second mounting bar (62) enables a first screw (66a) and a second screw (66b) to simultaneously engage both mounting bar (60) and second mounting bar (62). First screw (66a) is secured using a first nut (67a), and second screw (66b) is secured using a second nut (67b). While screws and nuts are depicted, other fastening means, such as bolts, pins, latches, hook and loop fasteners, and combinations thereof can also be used. While only two screws are visible in FIG. 3A, it is contemplated that mounting bars (60 and 62) can include means for engaging any number of screws or other fasteners.

First mounting bar (60) has a first locking hole (68a). Second mounting bar (62) has a second locking hole (68b). The placement of first locking hole (68a) and second locking hole (68b) is such that the interlaying of first mounting bar (60) and second mounting bar (62) align first locking hole (68a) and second locking hole (68b), to form a single hole through both mounting bars (60 and 62), which can engage a locking mechanism, such as a keyed lock, a biometric lock, a combination lock, a coded lock, or other similar locking means to deter and prevent theft of display device (12).

A right visor (70a) and a top visor (70b) are visible in FIG. 3A and are shown attached to display device (12). Right visor (70a) is attached using a first hinge (74a), a second hinge (74b), and a third hinge (74c). A fourth hinge (74d) attaching top visor (70b) to display device (12) is visible in FIG. 3A. A fifth hinge (74e) allows a retractable portion of top visor (70b) to fold behind top visor (70b). While five hinges are visible in the view provided by FIG. 3A, any number of hinges or similar means can be used to attach visors to display device (12). It is contemplated that a left visor, not visible in the view provided by FIG. 3A, can also attached to display device (12) using one or more hinges in symmetrical arrangement to right visor (70a).

It is contemplated that each of the visors is able to fold over the front of display device (12) when display device (12) is not in use, and to fold behind display device (12) when display device (12) is in use. Hinges can also include hinge locking means to selectively allow visors to be positioned to shield display device (12) from ambient light during use. In an embodiment, one or more visors can include aligning locking holes that allow a locking means to prevent access to the screen of display device (12).

Referring now to FIG. 3B, the mounting means of FIG. 3A are shown in an open position.

Display device (12) is shown attached to first mounting bar (60). First mounting bar (60) is attached to mounting ring (64). Mounting ring (64) is attached to second mounting bar (62). Second mounting bar (62) is shown disengaged from first mounting bar (60), creating an opening (72) in mounting ring (64), which can allow mounting ring (64) to engage a portion of a moving vehicle.

First screw (66a), first nut (67a), second screw (66b), and second nut (67b) are shown disengaged from first mounting bar (60) and second mounting bar (62). First mounting bar (60) has first locking hole (68a), and second mounting bar (62) has second locking hole (68b). FIG. 3B depicts first locking hole (68a) and second locking hole (68b) in misalignment.

Right visor (70a) is shown attached to display device (12) using first hinge (74a), second hinge (74b), and third hinge (74c). Top visor (70b) is shown attached to display device (12) using fourth hinge (74d). Top visor (70b) has fifth hinge (74e) enabling a retractable portion of top visor (70b) to fold over the remainder of top visor (70b).

Referring now to FIG. 4A, an alternative embodiment of the removable mounting means depicted in FIG. 3A is shown.

First mounting bar (60) is shown attached to mounting ring (64). Display device (12) is shown attached to second mounting bar (62). First mounting bar (60) is interlaid over second mounting bar (62), such that first mounting bar (60) abuts against display device (12) and extends between display device (12) and mounting ring (64). Second mounting bar (62) also extends between display device (12) and mounting ring (64).

First screw (66a), secured by first nut (67a), and second screw (66b), secured by second nut (67b), extend through the interlaid first mounting bar (60) and second mounting bar (62), thereby connecting the mounting bars (60 and 62), and securing display device (12) to mounting ring (64).

First mounting bar (60) has a first locking hole (68a), and second mounting bar (62) has a second locking hole (68b). First locking hole (68a) and second locking hole (68b) are positioned such that when first mounting bar (60) and second mounting bar (62) are interlaid, first locking hole (68a) and second locking hole (68b) align to form a single locking hole for receiving a locking means.

Display device (12) is shown having a right visor (70a), secured to display device (12) by first hinge (74a), second hinge (74b), and third hinge (74c). Top visor (70b) is shown secured to display device (12) by a fourth hinge (74d). Fifth hinge (74e) is disposed in top visor (70b) to allow a retractable portion of top visor (70b) to fold over the remainder of top visor (70b).

Referring now to FIG. 4B, the removable mounting means of FIG. 4A are shown in an open position.

First mounting bar (60) is shown attached to mounting ring (64). Display device (12) is shown attached to second mounting bar (62). First mounting bar (60) and second mounting bar (62) are shown disengaged. First screw (66a), first nut (67a), second screw (66b), and second nut (67b) are shown disengaged from the mounting bars (60 and 62).

First mounting bar (60) has a first locking hole (68a), and second mounting bar (62) has a second locking hole (68b). First locking hole (68a) and second locking hole (68b) are shown in misalignment.

Display device (12) is shown having a right visor (70a), secured to display device (12) by first hinge (74a), second hinge (74b), and third hinge (74c). Top visor (70b) is shown secured to display device (12) by a fourth hinge (74d). Fifth hinge (74e) is disposed in top visor (70b) to allow a retractable portion of top visor (70b) to fold over the remainder of top visor (70b).

Referring now to FIG. 5A, an embodiment of the removable mounting means is shown, disposed on a moving vehicle (10), having a right visor (70a), a top visor (70b), and a left visor (70c) disposed in a closed position over display device (12).

Mounting ring (64) is shown engaging a portion of moving vehicle (10).

First mounting bar (60) is shown connecting display device (12) to mounting ring (64). First screw (66a) and second screw (66b) secure first mounting bar (60) to a second mounting bar, not visible in this view. Locking hole (68) is disposed through first mounting bar (60) and the second mounting bar for receiving a locking means.

Right visor (70a) is shown connected to display device (12) using first hinge (74a), second hinge (74b), and third hinge (74c). Top visor (70b) is shown connected to display device (12) using fourth hinge (74d), sixth hinge (74f), and eighth hinge (74h). Left visor (70c) is shown connected to display device (12) using tenth hinge (74j), eleventh hinge (74k), and twelfth hinge (74l).

Top visor (70b) is shown having a fifth hinge (74e), a seventh hinge (74g), and a ninth hinge (74i), which allow a retractable portion of top visor (70b) to fold over the remainder of top visor (70b).

Referring now to FIG. 5B, the embodied removable mounting means of FIG. 5A is shown, disposed on a moving vehicle (10), having a right visor (70a), a top visor (70b), and a left visor (70c) disposed in an open position, such that display device (12) is visible.

Mounting ring (64) is shown engaging a portion of moving vehicle (10).

First mounting bar (60) is shown connecting display device (12) to mounting ring (64). First screw (66a) and second screw (66b) secure first mounting bar (60) to a second mounting bar, not visible in this view. Locking hole (68) is disposed through first mounting bar (60) and the second mounting bar for receiving a locking means.

Right visor (70a) is shown connected to display device (12) using first hinge (74a), second hinge (74b), and third hinge (74c). Top visor (70b) is shown connected to display device (12) using fourth hinge (74d), sixth hinge (74f), and eighth hinge (74h). Left visor (70c) is shown connected to display device (12) using tenth hinge (74j), eleventh hinge (74k), and twelfth hinge (74l).

Display device (12) is shown having a first speaker (40a), a second speaker (40b), and a row of light emitting diodes (78). While two speakers (40a and 40b) and a single row of light emitting diodes (78) are shown, display device (12) can have any number of speakers, lights, or other features, and can also omit the use of speakers or lights.

Figure 6:
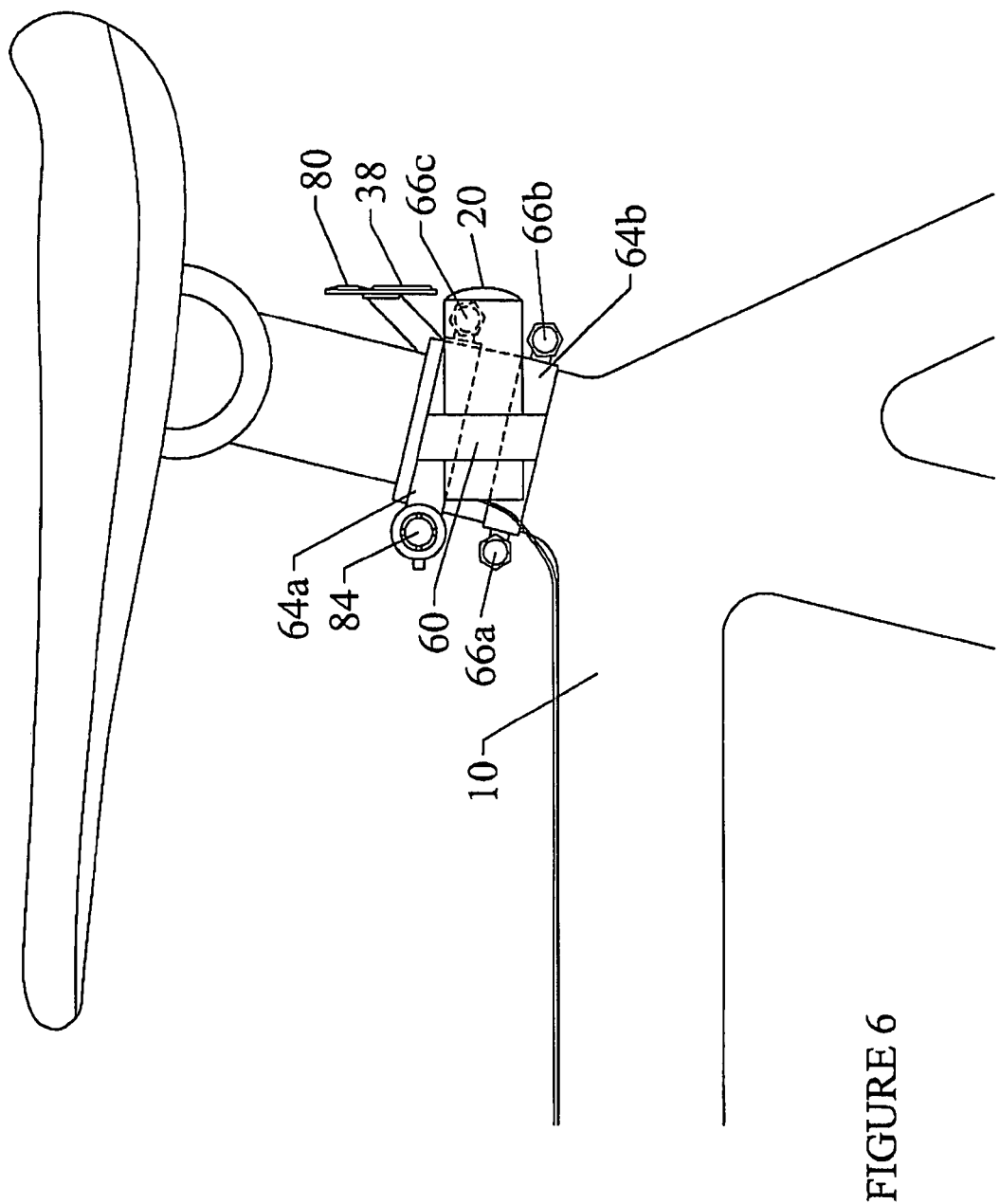
FIG. 6 depicts an alternative embodiment of removable mounting means for mounting the components of the present system on a moving vehicle.

Referring now to FIG. 6, an alternative embodiment of removable mounting means for mounting the components of the present system on a moving vehicle is shown.

A first mounting ring (64a) and a second mounting ring (64b) are depicted engaging a part of moving vehicle (10). While first mounting ring (64a) and second mounting ring (64b) are depicted engaging the post beneath a bicycle seat, first mounting ring (64a) and second mounting ring (64b) can engage any portion of any type of moving vehicle.

A mounting bar (60) extends between first mounting ring (64a) and second mounting ring (64b). First mounting ring (64a) and second mounting ring (64b) secure video device (20) to moving vehicle (10). Mounting bar (60) further encloses and secures video device (20) to moving vehicle (10).

Second mounting ring (64b) is secured to video device (20) and moving vehicle (10) using a first bolt (66a) and a second bolt (66b). While FIG. 6 depicts bolts securing second mounting ring (64b), other fastening means, such as screws, can also be used.

First mounting ring (64a) is secured to video device (20) and moving vehicle (10) using a third bolt (66c), and a locking device (84), which extends through a locking hole disposed through first mounting ring (64a).

FIG. 6 also depicts a light (38) secured to first mounting ring (64a) for illuminating the area viewed by video device (20). A motion sensor (80) is also depicted secured to first mounting ring (64a). It is contemplated that one or more lights or other notification features on a display device can be responsive to input from motion sensor (80).

While FIG. 6 depicts light (38) and motion sensor (80) secured to first mounting ring (64a), light (38) and motion sensor (80) can also be secured to second mounting ring (64b), mounting bar (60), video device (20), or any part of moving vehicle (10).

While these embodiments have been described with emphasis on the embodiments, it should be understood that within the scope of the appended claims, the embodiments might be practiced other than as specifically described herein.

What is claimed is:

1. A removable video safety system for a moving vehicle comprising:
   a display device adapted to be removably mounted on the moving vehicle, wherein the display device comprises at least one power source and a processor in communication with data storage;
   a video device adapted to be removably mounted on the moving vehicle, wherein the video device is in communication with the display device;
   an audio device in proximity to the display device, wherein the audio device is in communication with the display device and a wearable audio output device; and
   computer instructions in the data storage for instructing the processor to:
   receive a video stream from the video device;
   display the video stream on the display device;
   prevent operation of the audio device while the display device is not displaying the video stream;

permit operation of the audio device while the display device is displaying the video stream; and at least one motion sensor proximate to the video device and in communication with the display device, wherein the display device further comprises at least one light responsive to input from the at least one motion sensor.

2. The removable video safety system of claim 1, further comprising at least one audio file in the data storage and computer instructions in the data storage for instructing the processor to transmit the at least one audio file to the audio device.

3. The removable video safety system of claim 2, further comprising computer instructions for instructing the processor to display information relating to the at least one audio file on the display device.

4. The removable video safety system of claim 1, further comprising input means in the display device for controlling the video device, the audio device, the display device, or combinations thereof.

5. The removable video safety system of claim 1, wherein the moving vehicle is a member of the group consisting of: a bicycle, a motorcycle, an all-terrain vehicle, an automobile, a boat, a truck, a trailer, a barge, or combinations thereof.

6. The removable video safety system of claim 1, wherein the video device is a member of the group consisting of: a video camera, a digital camera, a cellular telephone, a portable computer, or combinations thereof.

7. The removable video safety system of claim 1, wherein the video device, the audio device, or combinations thereof are in wireless communication with the display device, direct communication with the display device, or combinations thereof.

8. The removable video safety system of claim 7, wherein the video device, the audio device, or combinations thereof are in wireless communication with the display device using a member of the group consisting of: the internet, a local area network, a wide area network, a satellite network, a cellular network, an infrared signal, a radio signal, a Bluetooth signal, or combinations thereof.

9. The removable video safety system of claim 1, wherein the audio device is a member of the group consisting of: a MP3 player, a portable radio, a WMA player, a cassette tape player, a compact disk player, a digital video disk player, a cellular telephone, a portable computer, a minidisk player, or combinations thereof.

10. The removable video safety system of claim 1, wherein the audio device, the video device, or combinations thereof comprise at least one additional power source.

11. The removable video safety system of claim 1, wherein the video stream is an analog video stream, a digital video stream, or combinations thereof.

12. The removable video safety system of claim 1, wherein the display device further comprising a converter for converting the analog video stream, the digital video stream, or combinations thereof to a selected format.

13. The removable video safety system of claim 1, wherein the display device, the audio device, the video device, or combinations thereof, further comprise at least one light connected to the at least one power source.

14. The removable video safety system of claim 1, wherein the at least one power source is charged using motion of the moving vehicle.

15. The removable video safety system of claim 1, further comprising at least one speaker connected to the display device.

16. The removable video safety system of claim 1, wherein the at least one power source comprises at least one battery, at least one rechargeable battery, at least one fuel cell, at least one solar panel, or combinations thereof.

17. The removable video safety system of claim 1, wherein the display device further comprises an odometer.

18. The removable video safety system of claim 1, further comprising a global positioning system connected to the display device, global positioning software in the data storage, or combinations thereof.

19. The removable video safety system of claim 1, wherein the data storage is removable data storage.

20. The removable video safety system of claim 1, wherein the audio device comprises an audio device processor in communication with audio device data storage.

\* \* \* \* \*